(12) United States Patent
Yasuno et al.

(10) Patent No.: US 10,697,933 B2
(45) Date of Patent: Jun. 30, 2020

(54) ION MOBILITY ANALYZING APPARATUS

(71) Applicant: SHIMADZU CORPORATION, Kyoto-shi, Kyoto (JP)

(72) Inventors: Motohide Yasuno, Kyoto (JP); Akiko Imazu, Kyoto (JP); Yoshinori Arita, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/375,136

(22) Filed: Apr. 4, 2019

(65) Prior Publication Data
US 2019/0376931 A1 Dec. 12, 2019

(30) Foreign Application Priority Data
Jun. 8, 2018 (JP) .................. 2018-110523

(51) Int. Cl.
*G01N 27/62* (2006.01)
*H01J 49/06* (2006.01)
*H01J 49/16* (2006.01)

(52) U.S. Cl.
CPC .......... *G01N 27/622* (2013.01); *H01J 49/065* (2013.01); *H01J 49/165* (2013.01)

(58) Field of Classification Search
CPC ....... G01N 27/622; H01J 49/065; H01J 49/16
USPC ........ 250/281, 282, 283, 288, 289, 290, 292
See application file for complete search history.

(56) References Cited

U.S. PATENT DOCUMENTS

| | | | |
|---|---|---|---|
| 2002/0121594 A1* | 9/2002 | Wang | H01J 49/004 250/281 |
| 2008/0272291 A1* | 11/2008 | Vestal | H01J 49/004 250/287 |
| 2012/0228490 A1 | 9/2012 | Wu et al. | |
| 2017/0328863 A1 | 11/2017 | Yasuno et al. | |
| 2019/0285583 A1* | 9/2019 | Wu | G01N 27/622 |

FOREIGN PATENT DOCUMENTS

WO 2016/079780 A1 5/2016

\* cited by examiner

*Primary Examiner* — Nicole M Ippolito
(74) *Attorney, Agent, or Firm* — Sughrue Mion, PLLC (57) ABSTRACT

An ion mobility analyzing apparatus includes: a drift tube having an internal space extending in a first direction; an ion chamber having an internal space extending in the first direction and connected to the drift tube; an ion gate installed at a boundary between the drift tube and the ion chamber and kept at a ground potential; an ion source supplying ions into the ion chamber; an ion detecting electrode arranged in the drift tube on a side opposite to the ion gate; a first voltage source supplying a first high voltage to the ion chamber; a second voltage source supplying a second high voltage, having an opposite polarity to that of the first high voltage, to the ion detecting electrode; and a signal transfer unit that detects a signal from the ion detecting electrode and transmits the signal to a data processing device operating with the ground potential.

7 Claims, 3 Drawing Sheets

ION MOBILITY ANALYZING APPARATUS

INCORPORATION BY REFERENCE

The disclosure of the following priority application is herein incorporated by reference: Japanese Patent Application No. 2018-110523 filed Jun. 8, 2018.

TECHNICAL FIELD

The present invention relates to an ion mobility analyzing apparatus.

BACKGROUND ART

A method of ionizing a molecule to be analyzed and moving it through gas at a generally atmospheric pressure to analyze the molecule to be analyzed based on a difference in traveling time due to a difference in mobility of ions in the gas is known and called Ion Mobility Spectrometry (IMS). An ion mobility analyzing apparatus employing ion mobility spectrometry has a cylindrical ion chamber in which ions are generated and a cylindrical drift tube in which ions are moved, wherein the ion chamber and the drift tube are connected in series, and an ion gate is provided at a boundary of the ion chamber and the drift tube. Ions to be analyzed, which have been generated in the ion chamber and have passed through the ion gate at a predetermined timing, are moved in the drift tube filled with gas at a generally atmospheric pressure, by an electric field formed in the ion chamber. A time is measured which is required for the ions to be analyzed to pass through the ion gate to reach the ion detecting electrode that is provided at the opposite end of the drift tube. A potential difference of several tens kilovolts is applied between both ends of the ion chamber and the drift tube in order to form an electric field that moves ions. Note that a value of the applied voltage varies depending on the sizes of the ion chamber and the drift tube. (See Patent Literature 1.)

CITATION LIST

Patent Literature

PTL1: WO2016/079780

SUMMARY OF INVENTION

Technical Problem

In conventional ion mobility analyzing apparatuses, in order to simplify a configuration of a detecting circuit that detects a signal from an ion detecting electrode, an end of the drift tube where the ion detecting electrode and the detecting circuit are arranged is set at a ground potential, which is easy to handle. Therefore, a high voltage of several tens kilovolts is applied to the ion chamber side, and a high voltage of approximately half of that voltage is also applied to a boundary between the ion chamber and the drift tube, in which the ion gate is arranged.

Thus, the control unit of the ion gate, which is required to have a high precision time control, is also required to withstand high voltages. This leads to an increase in size and cost.

Solution to Problem

An ion mobility analyzing apparatus according to the 1st aspect of the present invention comprising: a drift tube that has an internal space extending in a first direction; an ion chamber that has an internal space extending in the first direction and is connected to the drift tube; an ion gate that is installed at a boundary between the drift tube and the ion chamber and is kept at a ground potential; an ion source that supplies ions into the ion chamber; an ion detecting electrode that is arranged in the drift tube on a side opposite to the ion gate; a first voltage source that applies a first high voltage to the ion chamber; a second voltage source that applies a second high voltage to the ion detecting electrode, the second high voltage having a polarity opposite to that of the first high voltage; and a signal transfer unit that detects a signal from the ion detecting electrode and transmits the signal to a data processing device operating with the ground potential.

Advantageous Effects of Invention

According to the present invention, since the ion gate is set at the ground potential, high voltage resistance of the ion gate control unit connected to the ion gate is unnecessary. As a result, the ion gate control unit can be simplified.

BRIEF DESCRIPTION OF DRAWINGS

FIG. 2(*a*), FIG. 2(*b*) and FIG. 2(*c*) are view illustrating an ion gate and an ion gate control unit. FIG. 2(*a*) schematically illustrates the ion gate and the ion gate control unit, and FIGS. 2(*b*) and 2(*c*) illustrate changes of a voltage applied to the ion gate as a function of time.

DESCRIPTION OF EMBODIMENTS

First Embodiment of Ion Mobility Analyzing Apparatus

Figure 1:
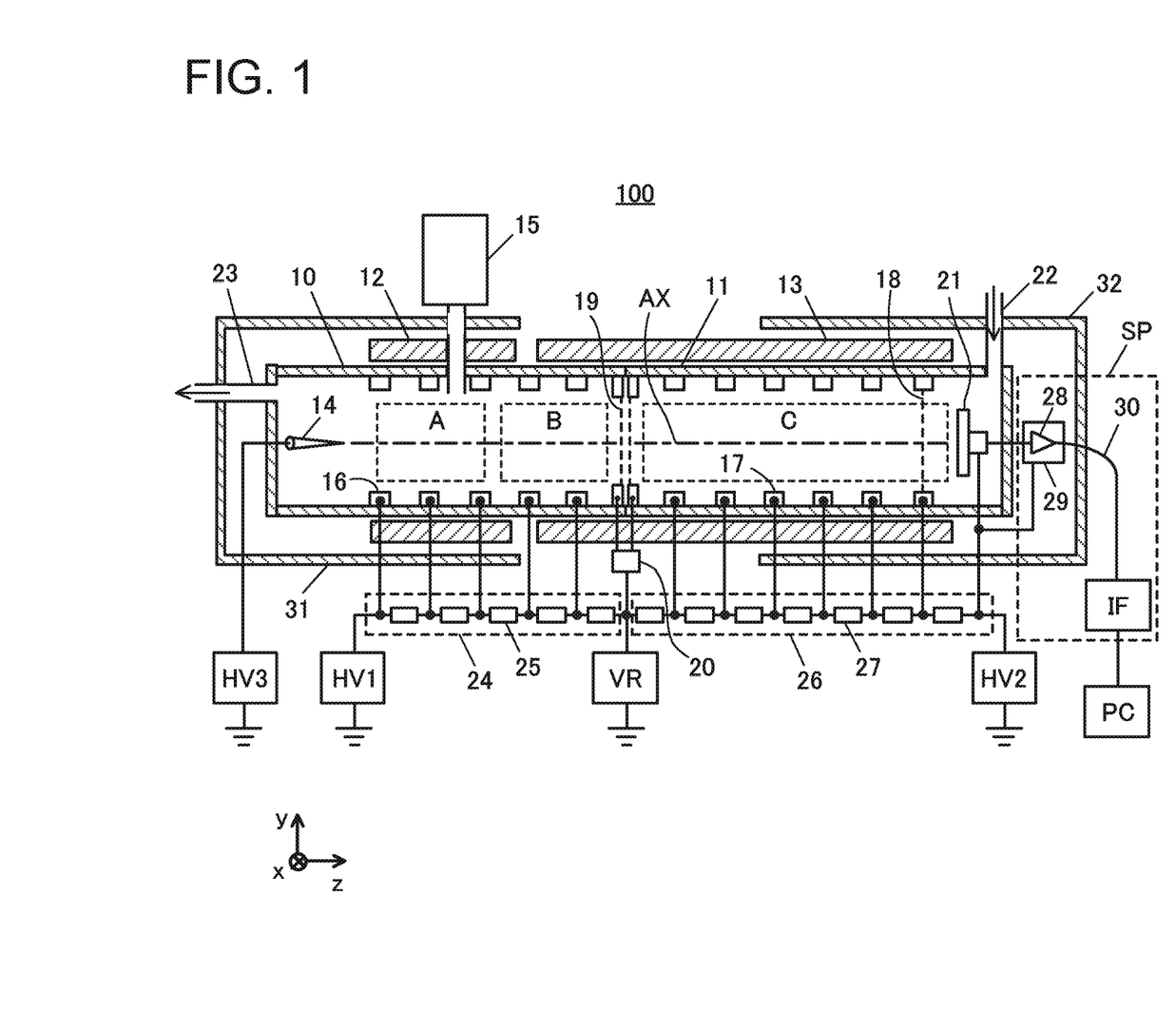
FIG. 1 is a cross-sectional view of an ion mobility analyzing apparatus according to a first embodiment.

FIG. 1 is a cross-sectional view illustrating an ion mobility analyzing apparatus 100 according to a first embodiment of the present invention. The ion mobility analyzing apparatus 100 includes an ion chamber 10 having an ionization region A formed therein, in which components in samples are ionized, and a drift tube 11 having a drift region C formed therein, in which ions are separated based on a difference in ion mobility. In this embodiment, both the ionization region A and the drift region C are spaces extending in a Z direction in FIG. 1. Additionally, the ion chamber 10 and the drift tube 11 are generally cylindrical bodies having the same inner diameter and are integrated with each other.

A heat pipe 12 for heating is provided around the ion chamber 10 and a heat pipe 13 for heating is provided around the drift tube 11.

A spray nozzle 15 for atmospheric pressure chemical ionization (APCI) is mounted on a peripheral surface of the ion chamber 10 so that a spraying direction of a liquid sample is generally orthogonal to the central axis of the ion chamber 10.

Note that the central axis of the ion chamber 10 and the central axis of the drift tube 11 coincide with each other and are parallel to the Z direction. These central axes are simply referred to as a central axis AX in the following description.

The spray nozzle 15 is supplied with a liquid sample from a liquid chromatograph apparatus (LC) (not illustrated). The spray nozzle 15 causes the liquid sample to be carried by a gas flow of a nebulizing gas (typically, an inert gas such as nitrogen and helium) and then sprayed into the ion chamber 10 through a drying tube, which is heated to a high temperature of approximately 300 to 500° C.

An ion gate (BN gate) 19 is provided at a boundary between the ion chamber 10 and the drift tube 11. The ion gate 19 has two interdigitated electrodes arranged in the same plane perpendicular to the Z direction in the figures. Although FIG. 1 shows two interdigitated electrodes spaced in the Z direction in order to illustrate that the ion gate 19 consists of the two interdigitated electrodes, two interdigitated electrodes are actually located in the same plane perpendicular to the Z direction, as described above. In the ion chamber 10, a needle electrode 14 for performing corona discharge is installed in an end opposite to an end on the side in which the ion chamber 10 is connected to the drift tube 11. Between the needle electrode 14 and the ion gate 19, a plurality of first-stage ring electrodes 16 are provided at a predetermined interval in a direction (Z direction) in which the central axis AX extends. At least one first-stage ring electrode 16 is also provided between the spray nozzle 15 and the ion gate 19, and at least one or more first-stage ring electrode 16 is also provided between the needle electrode 14 and the spray nozzle 15.

Following the first-stage ring electrodes 16 in the ion chamber 10, a plurality of second-stage ring electrodes 17 are also provided in the drift tube 11 at a predetermined interval in the direction (Z direction) in which the central axis AX extends.

In the drift tube 11, an ion detecting electrode 21 is installed in an end opposite to the side in which the drift tube 11 is connected to the ion chamber 10. A grid electrode 18 is provided between the ion detecting electrode 21 and the second-stage (i.e., the last-stage) ring electrode 17.

A gas introduction pipe 22 is connected to the peripheral surface of the drift tube 11 in the vicinity of the ion detecting electrode 21. Through the gas introduction pipe 22, a neutral gas (for example, nitrogen gas) is supplied into the drift tube 11 at a fixed flow rate. The neutral gas to be introduced into the drift tube 11 is heated to substantially the same temperature (approximately 200° C.) as the temperature in the drift tube 11, before the introduction.

The neutral gas supplied into the drift tube 11 flows from the ion detecting electrode 21 toward the needle electrode 14 and flows out through an exhaust port 23 provided in the end of the ion chamber 10.

In the first embodiment, the ion gate 19 is connected to a low potential DC voltage source VR via an ion gate control unit 20 that controls the ion gate 19. A potential applied from the low potential DC voltage source VR to the ion gate control unit 20 will be described later.

On the other hand, each of the plurality of first-stage ring electrodes 16 is connected to a first voltage divider 24. The first voltage divider 24 includes a series resistor array. One end of the first voltage divider 24 is connected to the low potential DC voltage source VR and the other end of the first voltage divider 24 is connected to a first voltage source HV1 generating a first high voltage of approximately 10 kV. Additionally, each of the plurality of second-stage ring electrodes 17, the grid electrode 18, and the ion detecting electrode 21 is connected to a second voltage divider 26. The second voltage divider 26 includes a series resistor array. One end of the second voltage divider 26 is connected to the low potential DC voltage source VR and the other end of the second voltage divider 26 is connected to a second voltage source HV2 generating a second high voltage of approximately 10 kV, the second high voltage having a sign opposite to the first high voltage.

As a result, different voltages are applied to the plurality of first-stage ring electrodes 16, the plurality of second-stage ring electrodes 17, and the grid electrodes 18, in accordance with a distance from the ion gate 19 to each electrode.

Additionally, a voltage is applied to the needle electrode 14 from a third voltage source HV3, the voltage being higher than the voltage from the first voltage source by several kilovolts in terms of absolute value so that an electric field necessary for corona discharge is generated at a tip of the needle electrode 14.

The above-described configurations allow an electric field to be formed from the needle electrode 14 toward the ion detecting electrode 21 within the ion chamber 10 and the drift tube 11.

In the ion mobility analyzing apparatus 100 according to the first embodiment, a high voltage of approximately 10 kV is applied to each end of the ion chamber 10 and the drift tube 11 due to the ion gate 19 being maintained at a ground potential. Voltage resistive covers 31 and 32 are thus preferably provided, respectively, in the vicinity of the left end of the ion chamber 10 in FIG. 1 and in the vicinity of the right end of the drift tube 11 in FIG. 1 in order to improve safety, as in conventional ion mobility analyzing apparatuses.

In the conventional ion mobility analyzing apparatuses, a high voltage of approximately 10 kV is applied to the ion gate and its control unit. This requires the control unit of the ion gate to have insulation resistance against high voltages, and also requires an insulated power source for supplying electric power to the control unit. These requirements result in an increased design and manufacturing cost of the control unit. In the first embodiment, the ion gate 19 is connected to a low potential DC voltage source VR via an ion gate control unit 20 that controls the ion gate 19.

In the first embodiment, a required high voltage resistance design of electronics of the ion gate control unit 20 is thus significantly simplified as compared with that in the conventional apparatuses, and the insulated power source is unnecessary. Thus, a simplification and a cost reduction of the ion gate control unit 20 can be achieved.

Further, in the conventional ion mobility analyzing apparatuses, the ion detecting electrode is set at the ground potential. Thus, a high voltage of approximately twice the voltage applied to the ion gate unit has to be supplied to the ion source arranged on a side opposite to the ion detecting electrode. A high voltage of several tens kilovolts is thus applied to a first half (an upstream part in the flow of ions) of the apparatus in which the ion source is arranged, which leads to an increased creepage distance and a space distance for preventing discharge. It is thus difficult to reduce the size of the apparatus.

In the first embodiment, the ion gate 19 is set at the ground potential (a low potential) as described above. As a result, potentials applied to the ion sources of the spray nozzle 15 and the needle electrode 14 can be reduced to approximately half as compared with the conventional apparatuses. This can result in a simplification of an insulating structure in the vicinity of the spray nozzle 15 and the needle electrode 14 (in the first half of the apparatus), or a reduction in the creepage distance and space distance. The apparatus can thus be reduced in size.

The potential generated by the low potential DC voltage source VR is set to a potential that allows a simplification of the required high voltage resistant design of the ion gate control unit 20 and a reduction in the absolute values of third, first, and second high voltages applied to the ion sources (14, 15), the ion chamber 10, and the ion detecting electrode 21, respectively. As an example, the potential generated by the low potential DC voltage source VR is a potential within approximately +/−1000 V with respect to a true ground potential supplied from a facility where the ion mobility analyzing apparatus 100 is installed.

In the conventional ion mobility analyzing apparatuses, a high potential of approximately 10 kV is applied to the ion gate control unit. The potential of 1000 V (1 kV) in this embodiment is significantly lower than the high potential in the conventional apparatuses. A required high voltage resistant design of the ion gate control unit 20 is thus simplified.

Alternatively, the potential generated by the low potential DC voltage source VR is a potential of approximately +/−1000 V or less with respect to a true ground potential. By setting the ion gate control unit 20 to such a low potential, an insulating design can be easily provided, and a further cost reduction can be achieved.

Further, the potential generated by the low potential DC voltage source VR is a potential of approximately +/−10 V or less with respect to a true ground potential. In this case, inexpensive common electronic components can be used since the voltage resistance of electronic components used for the ion gate control unit 20 is unnecessary. Alternatively, the low potential DC voltage source VR may be eliminated and the potential of the ion gate control unit 20 may be set to a true ground potential supplied from a facility where the ion mobility analyzing apparatus 100 is installed. In this case, advantageously, the low potential DC voltage source VR itself may be omitted.

Note that, in the ion mobility analyzing apparatus 100 that handles a high voltage of approximately 10 kV, a potential within approximately +/−1,000 V (1 kV) may be considered as, relatively, a ground potential. Therefore, in this specification, a potential within +/−1000 V from the true ground potential supplied from the facility where the ion mobility analyzing apparatus 100 is installed is referred to as a ground potential.

An operation of analyzing ions in a sample in the ion mobility analyzing apparatus 100 according to the first embodiment will be described.

In the ion mobility analyzing apparatus 100 according to the first embodiment, a desolvation region B is provided between an ionization region A in which a molecule to be analyzed is ionized and a drift region C in which ions are separated and detected. In the desolvation region B, vaporization of solvents is facilitated for ions to be analyzed having insufficiently vaporized solvents.

Once a liquid sample containing components separated in the liquid chromatograph (LC) (not illustrated) reaches the APCI spray nozzle 15, the liquid sample is sprayed as microdroplets to the ionization region A in the ion chamber 10 due to heating by the drying tube in the spray nozzle 15 and with the help of the nebulizing gas. Since the ion chamber 10 is heated to a high temperature (typically, approximately 150 to 300° C.) by the heat pipe 12, the solvent contained in the microdroplet is further vaporized, so that the components to be analyzed in the sample become gas molecules.

A spacing in the Z direction between the tip of the needle electrode 14 and the first-stage ring electrode 16 at the leftmost side in the figure is approximately several millimeters to 10 mm, and a high voltage applied from the third voltage source HV3 to the needle electrode 14 causes an electric field to converge at the tip of the needle electrode 14 in order to generate corona discharge from the needle electrode 14. This corona discharge causes ionization of an atmosphere surrounding the tip of the needle electrode 14, the neutral gas flowing from the drift tube 11, or other gases, so that primary ions are generated. The generated primary ions are moved to the ionization region A by the electric field inside the ion chamber 10.

After reaching the ionization region A, the primary ions react with the liquid sample as the microdroplets emitted from the spray nozzle 15 or already desolvated gas molecules to ionize them, thereby generating ions to be analyzed. Therefore, the spray nozzle 15 and the needle electrode 14 can be considered as ion sources.

Note that a polarity of ions of sample components to be generated is the same as a polarity of the primary ions, and the polarity of the primary ions depend on a polarity of the voltage applied to the needle electrode 14.

The polarity of the voltage to be applied from the third voltage source HV3 to the needle electrode 14 is therefore determined in accordance with the polarity of the ions to be analyzed. Polarities of the voltages of the first voltage source HV1 and the second voltage source HV2 are also changed accordingly.

In the case of the ions to be analyzed being a cation, a positive high voltage is generated in the first voltage source HV1 and a negative high voltage is generated in the second voltage source HV2. In the case of the ions to be analyzed being an anion, a negative high voltage is generated in the first voltage source HV1 and a positive high voltage is generated in the second voltage source HV2.

The ions to be analyzed generated in the vicinity of the ionization region A moves toward the ion gate 19 under the action of the electric field formed by the voltage applied to the first-stage ring electrode 16. In the ionization region A, ions to be analyzed containing droplets, with the solvent being not completely vaporized, are also generated and directed to the ion gate 19 under the action of the electric field, together with the gaseous ions to be analyzed.

As described above, the ion chamber 10 and the drift tube 11 are heated to a temperature of approximately 200° C. by the heat pipes 12, 13, and the neutral gas to be introduced into the drift tube 11 is also heated to the substantially same temperature before the introduction. Therefore, the ions to be analyzed containing droplets are also exposed to the high-temperature neutral gas when passing through the desolvation region B, so that vaporization of the solvents is further facilitated for desolvation to generate gaseous ions to be analyzed.

Note that, in the desolvation region B, a gradient of a potential in the region is set smaller at a position closer to the ion gate 19; thus, ions to be analyzed reaching the ion gate 19 when the ion gate 19 is in the closed state can remain clogged or can be diffused in front of the ion gate 19. In this case, the ions to be analyzed, which have been clogged, also pass through the ion gate 19 into the drift region C during a period when the ion gate 19 is in the open state. Such setting of the gradient of the potential can be performed by adjusting each interval between the plurality of first-stage ring electrodes 16 or by adjusting a magnitude of an electric resistance of each resistor 25 in the series resistor array constituting the first voltage divider 24.

The ion gate 19 is periodically switched between an open state in which ions can pass through the ion gate 19 and a closed state in which passage of ions is blocked, by voltages applied to the two interdigitated electrodes constituting the ion gate 19 from the ion gate control unit 20.

A time period during which the ion gate 19 is in the open state is sufficiently short as compared with a drift time required for the ions to be analyzed to reach the ion detecting electrode 21 from a time point at which the ions have passed through the ion gate 19. The ion mobility analyzing apparatus 100 measures a time required for the ions to be analyzed to drift from the ion gate 19 to the ion detecting electrode 21, starting from a time point at which the ion gate 19 is in the open state.

Figure 2A:
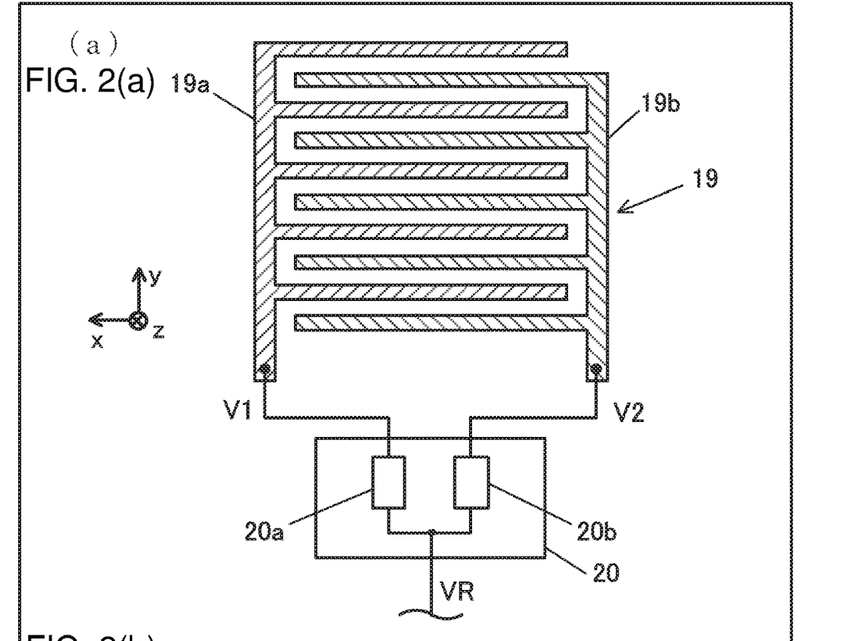

FIG. 2(a) is a view illustrating an outline of the ion gate 19 and the ion gate control unit 20.

The ion gate 19 is a so-called BN gate (Bradbury-Nielsen gate), having two interdigitated electrodes 19a, 19b arranged in an electrically insulated manner in the same XY plane in the figure. Hereinafter, the two interdigitated electrodes 19a, 19b are collectively referred to as an interdigitated electrode pair. The two interdigitated electrodes 19a, 19b each have a width of approximately 100 μm and are arranged so that they do not contact each other in the same plane.

Potentials V1, V2 are applied to respective one of the interdigitated electrodes 19a, 19b. The potentials V1, V2 have a predetermined potential difference of approximately 100 V generated by the pulse voltage generator 20a, 20b in the ion gate control unit 20, with respect to a low potential (VR) outputted by the low potential DC voltage source VR.

When the potentials V1, V2 of the two interdigitated electrodes 19a, 19b are the same, the ion gate 19 is in an open state. When a potential difference is applied between the two interdigitated electrodes 19a, 19b in the same plane to form an electric field that prevents the ions from passing through in the +Z direction, the ion gate 19 is in a closed state.

Figure 2B:
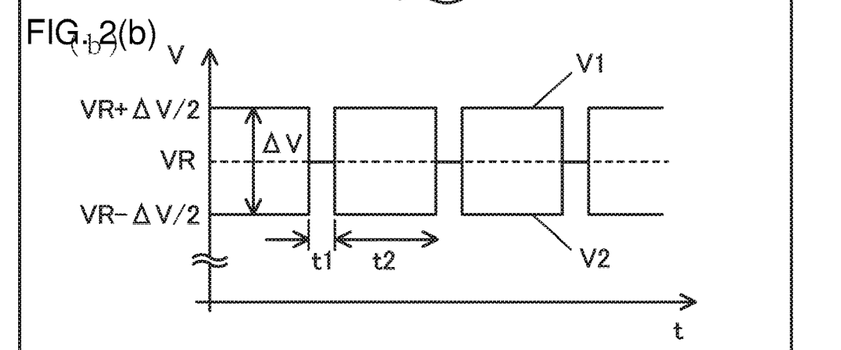

FIG. 2(b) illustrates an example of a change in the voltage applied to the ion gate 19 as a function of time. In a time zone denoted by t2, the potential V1 of the interdigitated electrode 19a is VR+ΔV/2 and the potential V2 of the interdigitated electrode 19b is VR−ΔV/2 so that the potential difference ΔV is applied between the interdigitated electrode 19a and the interdigitated electrode 19b. Thus, the ion gate 19 is in a closed state.

On the other hand, in a time zone denoted by t1, the potential V1 of the interdigitated electrode 19a and the potential V2 of the interdigitated electrode 19b are both VR, that is, they have the same potential. Thus, the ion gate 19 is in the open state.

A high precision time control is required for opening and closing the ion gate 19 because the ion mobility analyzing apparatus 100 is an apparatus that analyzes the ions to be analyzed by measuring a time required for the ions to be analyzed to drift from the ion gate 19 to the ion detecting electrode 21.

In the conventional ion mobility analyzing apparatuses, a high voltage of approximately 10 kV is applied to the ion gate and its control unit, and the control unit is thus required to operate with high voltage resistance and high precision. For this reason, a complexity of the configuration of the control unit is unavoidable, which inevitably results in a higher cost.

In the ion mobility analyzing apparatus 100 of the first embodiment, the ion gate control unit 20 is kept at the ground potential. Advantageously, a required high voltage resistance design of the electronic circuit can thus be significantly simplified as compared with the conventional apparatuses, which leads to a simplification and a cost reduction of the ion gate control unit 20.

Figure 2C:
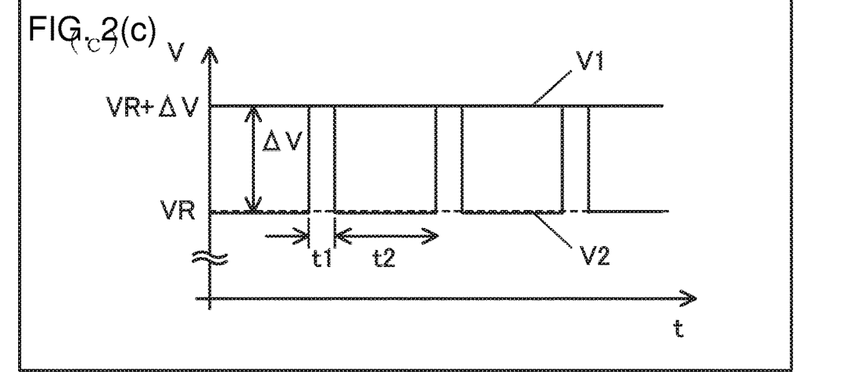

FIG. 2(c) illustrates another example of a change in the voltage applied to the ion gate 19 as a function of time. In the example of FIG. 2(c), in contrast to the example of FIG. 2(b), the ion gate 19 is opened and closed by controlling only one of the potential V1 of the interdigitated electrode 19a and the potential V2 of the interdigitated electrode 19b. In other words, the potential V1 of the interdigitated electrode 19a is always set to VR+ΔV, and only the potential V2 of the interdigitated electrode 19b is changed between VR and VR+ΔV to open and close the ion gate 19.

In the example of FIG. 2(c), power of the pulse voltage generators 20a, 20b can be saved since it is only necessary to drive the pulse voltage generator 20b only for a short time (t1) during which the ion gate 19 is open.

Note that the ion gate 19 is not limited to the above-described BN gate, but may be a so-called Tyndall gate, in which two lattice electrodes are spaced opposite to each other in the Z direction in the figure. In the following description, the two lattice electrodes constituting the Tyndall gate are collectively referred to as a lattice electrode pair. Also when a Tyndall gate is used, as in the case of using the above-described BN gate, the ion gate control unit 20 shields ions by applying a potential difference to the lattice electrode pair constituting the Tyndall gate, and allows ions to pass through by applying the same potential to both electrodes of the lattice electrode pair.

After passing through the ion gate 19, the ions to be analyzed move through the drift region C by means of an electric field formed in the drift region C to reach the ion detecting electrode 21. Since each of the ions to be analyzed has different mobilities in the neutral gas filled in the drift region C, a time required for the movement through the drift region C is different for each ion. The ion detecting electrode 21 transmits an electric signal according to an amount of ions (an amount of electric charges) arriving the ion detecting electrode 21 at each time, to a subsequent detecting circuit 28. The detecting circuit 28 performs at least one of signal processing operations such as amplification, current-voltage conversion, analog/digital conversion, and filter processing, on the electric signal from the detecting electrode 21.

As described above, in the first embodiment, the second high voltage is applied to the ion detecting electrode 21. The second high voltage is therefore also applied to the detecting circuit 28 which is connected to the ion detecting electrode 21 via an electric line and processes the electric signal from the ion detecting electrode 21, so as to prevent dielectric breakdown. In other words, the detecting circuit 28 is floated with second high voltage. In the first embodiment, as illustrated in FIG. 1, the circuit substrate 29 having the detecting circuit 28 mounted thereon is connected to the second voltage source HV2 and is floated with the second high voltage.

The detecting circuit 28 has a circuit that further converts the processed signal into an optical signal. The optical signal converted in the detecting circuit 28 is transmitted to the input device IF installed with the ground potential via an optical fiber 30. Then, the signal is converted again into an electric signal by the input device IF and inputted to a data processing device PC, such as a computer. Since the optical fiber 30 is an electrically insulating material, the optical fiber 30 can transmit the optical signal from the detecting circuit 28 floated with the second high voltage to the input device IF installed with the ground potential, while maintaining an electrically insulated state.

The optical signal transmitted from the detecting circuit 28 to the input device IF may be an analog signal or a digital signal.

Further, the detecting circuit 28 may be configured to convert the electric signal from the ion detecting electrode 21 into an electric wave signal having a RF frequency or the like or a magnetic signal, instead of the optical (light) signal, to transmit the signal to the input device IF. Both light and electric waves having RF frequencies or the like belong to electromagnetic waves.

In the case of converting the electric signal from the ion detecting electrode 21 into a magnetic signal, two coils are provided on the detecting circuit 28 side and the input device IF side with an insulating plate interposed therebetween, for example. Then, a signal current flows through the coil on the detecting circuit 28 side to induce an electric current on the input device IF side by electromagnetic induction to transmit the signal. Also with these transmission methods, the signal can transmit from the detecting circuit 28 floated with the second high voltage to the input device IF installed with the ground potential, while maintaining an electrically insulated state.

The detecting circuit 28, the circuit substrate 29, the optical fiber 30, and the input device IF, all together, can be considered as a signal transfer unit SP.

Note that, in the ion mobility analyzing apparatus 100 according to the first embodiment described above, the ion chamber 10 and the drift tube 11 are not clearly distinguished from each other. In the first embodiment, as described above, the ion chamber 10 and the drift tube 11 are generally cylindrical bodies having the same inner diameter and they are integrated with each other. In the above-described integrated generally cylindrical bodies, a part in the spray nozzle 15 side with respect to the ion gate 19 may be considered as the ion chamber 10, and a part in the ion detecting electrode 21 side with respect to the ion gate 19 may be considered as the drift tube 11.

Additionally, in the ion mobility analyzing apparatus 100 according to the first embodiment described above, the gradient of the electric field in the drift tube 11 may also be changed. The gradient of the electric field in the drift tube 11 can be set by adjusting each interval between the plurality of second-stage ring electrodes 17 or by adjusting a magnitude of each electric resistor 27 of the series resistor array constituting the second voltage divider 26.

Instead of the first voltage divider 24 and the second voltage divider 26 including the series resistor array, the side surfaces of the ion chamber 10 and the drift tube 11 themselves can also be used as voltage dividers. In this case, the ion chamber 10 and the drift tube 11 may be made of a high-resistance conductor, or a high-resistance conductor part may be formed in the inner wall thereof. The ion chamber 10 and the drift tube 11 may be a laminate of a metal ring and an insulator ring.

Second Embodiment of Ion Mobility Analyze

Figure 3:
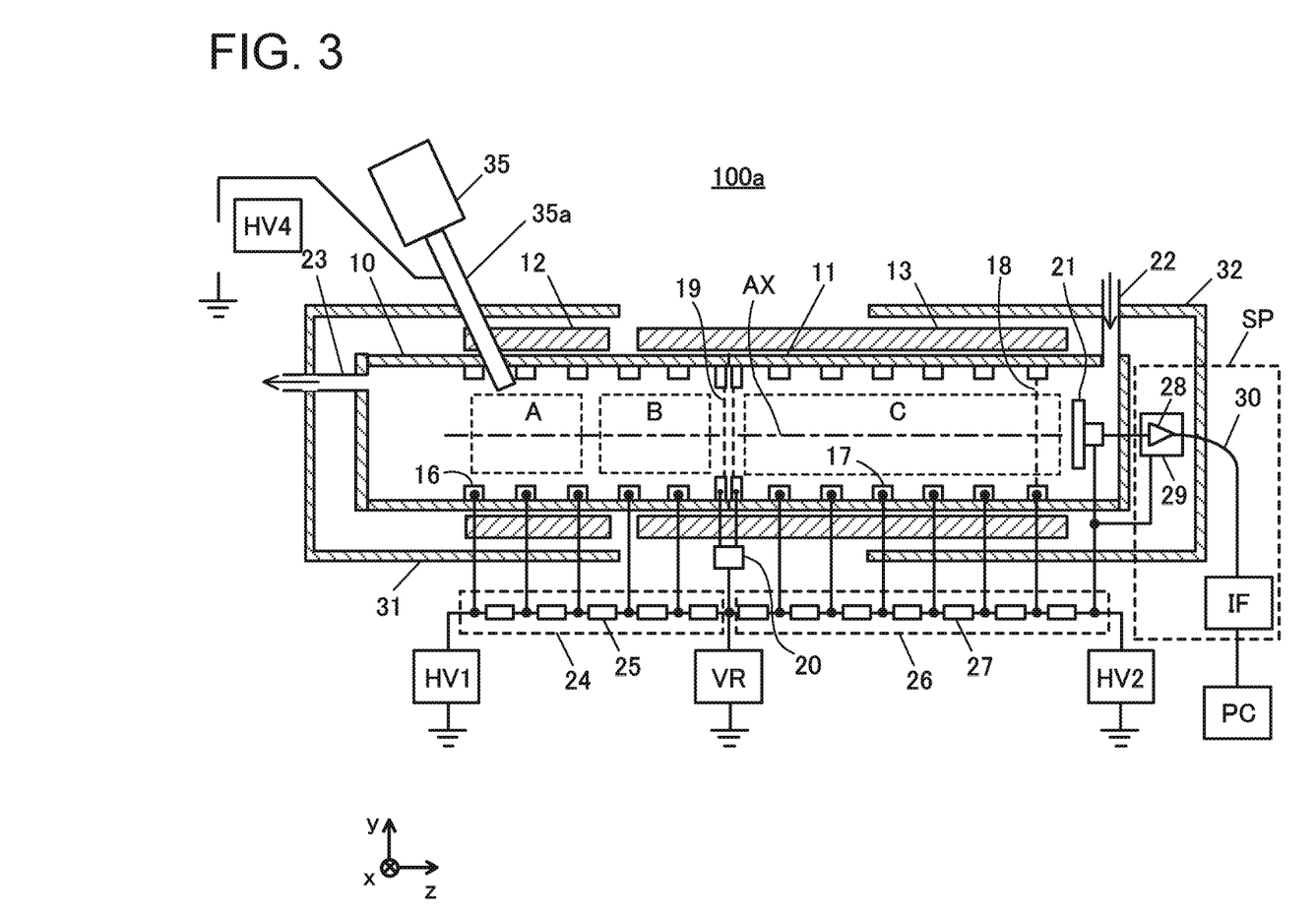
FIG. 3 is a cross-sectional view of an ion mobility analyzing apparatus according to a second embodiment.

FIG. 3 is a cross-sectional view showing an ion mobility analyzing apparatus 100a according to a second embodiment of the present invention. The same parts as in the ion mobility analyzing apparatus 100 according to the first embodiment described above are denoted by the same reference numerals, and description thereof will be omitted. In the ion mobility analyzing apparatus 100a according to the second embodiment, an electrospray ion source (ESI) is used as an ion source that supplies ions to be analyzed into the ion chamber 10. In other words, the ESI 35 is installed on the peripheral surface of the ion chamber 10, instead of the APCI spray nozzle 15 in the above-described first embodiment.

A liquid sample supplied from the liquid chromatograph (LC) (not illustrated) to the ESI 35 is sprayed as charged droplets, while passing through an electric field caused by a high voltage applied to a metal capillary 35a at a tip of the ESI 35 from a fourth high voltage source HV 4. The charged droplets are made smaller due to shearing force caused by a nebulizer gas and Coulomb repulsive force on surfaces of the droplets, and gaseous ions to be analyzed are formed in the course of vaporization of the solvent caused by heat.

Here, the direction of spraying the liquid sample from the ESI 35 is not a direction orthogonal to the central axis AX, but a direction oriented to the ion gate 19 at an angle so as to obliquely intersect the central axis AX. The reason thereof is that this configuration facilitates the movement of the charged droplets and the ions to be analyzed, which are generated from the charged droplets, toward the ion gate 19. Further, since the ESI 35 is not arranged on the axis, this configuration can prevent charged droplets existing in the case of insufficient desolvation from directly attaching to the ion gate, which would lead to an unstable operation of the apparatus.

In the ion mobility analyzing apparatus 100a according to the second embodiment, the ion gate 19 is maintained at a ground potential as in the first embodiment described above.

Note that an ion source based on atmospheric pressure photoionization (APPI) may be used as an ion source that supplies ions to be analyzed into the ion chamber 10. In this case, the needle electrode 14 and the third voltage source HV3 are eliminated from the ion mobility analyzing apparatus 100 according to the above-described first embodiment and, instead, a light source for irradiating light (ultraviolet radiation) to the ionization region A is arranged.

Effect of Embodiment of Ion Mobility Analyzing Apparatus (1) The ion mobility analyzing apparatus according to the above embodiments comprises: a drift tube 11 that has an internal space extending in a Z direction (a first direction); an ion chamber 10 that has an internal space extending in the Z direction (the first direction) and is connected to the drift tube 11; an ion gate 19 that is installed at a boundary between the drift tube 11 and the ion chamber 10 and is kept at a ground potential; an ion source (a needle electrode 14, a APCI spray nozzle 15, ESI 35) that supplies ions into the ion chamber 10; and an ion detecting electrode 21 that is arranged on a side opposite to the ion gate 19 in the drift tube. The ion mobility analyzing apparatus further comprises: a first voltage source HV1 that applies a first high voltage to the ion chamber 10; a second voltage source HV2 that applies a second high voltage to the ion detecting electrode 21, the second high voltage having a polarity opposite to that of the first high voltage; and a signal transfer unit SP that detects a signal from the ion detecting electrode 21 and transmits the signal to a data processing device PC operating with the ground potential.

With such a configuration, the ion gate 19 and the ion gate control unit 20 that controls the ion gate 19 is substantially at the ground potential, so that a high voltage resistance structure of the ion gate control unit 20 and an insulated power source for supplying power to the ion gate control unit, which are conventionally necessary, can be simplified to achieve a cost reduction of the ion gate control unit 20.

Furthermore, since the ion gate located substantially in the center of the ion mobility analyzing apparatus is set generally at the ground potential, the absolute value of the high voltage applied to both ends of the apparatus is approximately halved as compared with the conventional apparatuses. In the conventional ion mobility analyzing apparatuses, it is necessary to make a larger creepage distance of an insulator arranged between electrodes and a larger space distance between electrodes in order to prevent discharge, which makes it difficult to reduce the size of the apparatus. In the present embodiment, by setting the ion gate to approximately the ground potential, a voltage applied to the apparatus is reduced, so that the structure for preventing discharge can be simplified and the apparatus can be reduced in size.

(2) Further, by at least a part of the signal transfer unit SP floated with the second high voltage, it is possible to prevent dielectric breakdown of the electric circuit (detecting circuit 28) constituting the signal transfer unit SP electrically connected to the ion detecting electrode 21, to which the second high voltage is applied.

(3) Further, in the ion chamber 10, a plurality of first-stage ring electrodes 16 having openings are arranged one after another in the Z direction (the first direction), and a voltage is applied to each of the first-stage ring electrodes 16, the voltage being a result of dividing the first high voltage in accordance with a distance from the ion gate 19; in the drift tube 11, a plurality of second-stage ring electrodes 17 having openings are arranged one after another in the Z direction (the first direction), and a voltage is applied to each of the second-stage ring electrodes 17, the voltage being a result of dividing the second high voltage in accordance with a distance from the ion gate 19.

With this configuration, the ions to be analyzed can be efficiently moved (drifted) inside the ion chamber 10 and the drift tube 11.

(4) In (3), further, at least one front-stage ring electrode 16 may be arranged between the ion gate 19 and the ion sources (14, 15, 35). With this configuration, a potential difference between the ion source and the ion gate 19 can be provided such that the ion transport efficiency increases. This allows the ions to be analyzed to efficiently move from the ion source to the ion gate 19 while the ions are desolvated.

(5) In (3) or (4), the ion source may further include: an atmospheric pressure chemical ionization spray nozzle (a sample spraying unit) 15 that sprays a liquid sample to be analyzed into the ion chamber 10; a needle electrode 14 that is arranged at a position farther from the ion gate 19 than a position of the spray nozzle 15, and to which a third high voltage is applied.

With this configuration, the ions to be analyzed can be efficiently generated by atmospheric pressure chemical ionization (APCI).

(6) Further, the signal transfer unit SP converts a signal from the ion detecting electrode 21 into an electromagnetic wave signal and transmits the electromagnetic wave signal to the data processing device PC. This can provide a convenient transmission of the signal from the signal transfer unit SP to the data processing device PC, wherein the second high voltage is applied to at least a part of the signal transfer unit SP.

(7) Further, the ion gate may be an interdigitated electrode pair that is arranged such that two interdigitated electrodes do not electrically contact each other in the same plane orthogonal to the first direction, or a lattice electrode pair that is arranged such that two lattice electrodes spaced opposite to each other in the first direction do not electrically contact each other. The ion gate 19 may further has an ion gate control unit that shields ions by applying a predetermined potential difference to the interdigitated electrode pair or the lattice electrode pair, and allows ions to pass through by applying the same potential to the interdigitated electrode pair or the lattice electrode pair. With this configuration, the ion gate 19 can be controlled in an accurate and more simplified manner by the ion gate control unit 20 being kept approximately at the ground potential.

Although various embodiments and modifications have been described above, the present invention is not limited to these. Further, the embodiments may be applied alone or in combination. Other aspects considered within the technical idea of the present invention are also included within the scope of the present invention.

REFERENCE SIGNS LIST 100, 100a: ion mobility analyzing apparatus, 10: ion chamber, 11: drift tube, 12, 13: heat pipe, 14: needle electrode, 15: atmospheric pressure chemical ionization (APCI) spray nozzle, 16: first-stage ring electrode, 17: second-stage ring electrode, 18: grid electrode, 19: ion gate, 20: ion gate control unit, 21: ion detecting electrode, 24: first voltage divider, 26: second voltage divider, 28: detecting circuit, 29: circuit substrate, 30: optical fiber, 31, 32: voltage resistance cover, 35: ESI, VR: low potential DC voltage source, HV1: first voltage source, HV2: second voltage source, HV3: third voltage source, HV4: fourth voltage source, IF: input device, PC: data processing device

The invention claimed is:

1. An ion mobility analyzing apparatus, comprising:
a drift tube that has an internal space extending in a first direction;
an ion chamber that has an internal space extending in the first direction and is connected to the drift tube;
an ion gate that is installed at a boundary between the drift tube and the ion chamber and is kept at a ground potential;
an ion source that supplies ions into the ion chamber;
an ion detecting electrode that is arranged in the drift tube on a side opposite to the ion gate;
a first voltage source that applies a first high voltage to the ion chamber;
a second voltage source that applies a second high voltage to the ion detecting electrode, the second high voltage having a polarity opposite to that of the first high voltage; and
a signal transfer unit that detects a signal from the ion detecting electrode and transmits the signal to a data processing device operating with the ground potential.

2. The ion mobility analyzing apparatus according to claim 1, wherein:
at least a part of the signal transfer unit is floated with the second high voltage.

3. The ion mobility analyzing apparatus according to claim 1, wherein:
in the ion chamber, a plurality of first-stage ring electrodes having openings are arranged one after another in the first direction, and a voltage is applied to each of the first-stage ring electrodes, the voltage being a result of dividing the first high voltage in accordance with a distance from the ion gate; and
in the drift tube, a plurality of second-stage ring electrodes having openings are arranged one after another in the first direction, and a voltage is applied to each of the second-stage ring electrodes, the voltage being a result of dividing the second high voltage in accordance with a distance from the ion gate.

4. The ion mobility analyzing apparatus according to claim 3, wherein:
  at least one front-stage ring electrode is arranged between the ion gate and the ion source.

5. The ion mobility analyzing apparatus according to claim 3, wherein:
  the ion source includes:
    a sample spraying unit that sprays a liquid sample to be analyzed into the ion chamber; and
    a needle electrode that is arranged at a position farther from the ion gate than a position of the sample spraying unit, and to which a third high voltage is applied.

6. The ion mobility analyzing apparatus according to claim 1, wherein:
  the signal transfer unit converts a signal from the ion detecting electrode into an electromagnetic wave signal and transmits the electromagnetic wave signal to the data processing device.

7. The ion mobility analyzing apparatus according to claim 1, wherein:
  the ion gate is an interdigitated electrode pair that is arranged such that two interdigitated electrodes do not electrically contact each other in the same plane orthogonal to the first direction, or a lattice electrode pair that is arranged such that two lattice electrodes spaced opposite to each other in the first direction do not electrically contact each other; and
  the ion gate has an ion gate control unit that shields ions by applying a predetermined potential difference to the interdigitated electrode pair or the lattice electrode pair, and allows ions to pass through by applying the same potential to the interdigitated electrode pair or the lattice electrode pair.

* * * * *